(12) United States Patent
Jarvis, III

(10) Patent No.: US 9,814,223 B2
(45) Date of Patent: Nov. 14, 2017

(54) INTERCHANGEABLE FISHING LURE SYSTEM

(71) Applicant: Jesse Burkett Jarvis, III, Alexandria, VA (US)

(72) Inventor: Jesse Burkett Jarvis, III, Alexandria, VA (US)

( * ) Notice: Subject to any disclaimer, the term of this patent is extended or adjusted under 35 U.S.C. 154(b) by 134 days.

(21) Appl. No.: 14/503,950

(22) Filed: Oct. 1, 2014

(65) Prior Publication Data

US 2015/0089859 A1    Apr. 2, 2015

Related U.S. Application Data

(60) Provisional application No. 61/885,626, filed on Oct. 2, 2013.

(51) Int. Cl.
*A01K 85/00* (2006.01)
*A01K 85/18* (2006.01)
*A01K 85/16* (2006.01)

(52) U.S. Cl.
CPC .............. *A01K 85/18* (2013.01); *A01K 85/16* (2013.01)

(58) Field of Classification Search
USPC .................................. 43/42.35, 42.09, 42.36
See application file for complete search history.

(56) References Cited

U.S. PATENT DOCUMENTS

| | | | | |
|---|---|---|---|---|
| 2,734,302 A * | 2/1956 | Wright, Jr. | ............. | A01K 85/16 43/42.05 |
| 3,973,349 A * | 8/1976 | England | ................ | A01K 91/20 43/4 |
| 5,197,220 A * | 3/1993 | Gibbs | .................... | A01K 85/16 43/42.09 |
| 8,627,594 B1 * | 1/2014 | Weron | ................... | A01K 85/16 43/42.09 |
| 2010/0205849 A1 * | 8/2010 | Choi | ...................... | A01K 85/16 43/42.35 |
| 2014/0190064 A1 * | 7/2014 | Fellbaum | ............... | A01K 85/16 43/42.09 |

* cited by examiner

*Primary Examiner* — Joanne Silbermann
(74) *Attorney, Agent, or Firm* — The Marbury Law Group, PLLC

(57) ABSTRACT

The various embodiments provide for a fishing lure configured to allow a fisherman to quickly change the body of the fishing lure without having to cut the line. In the various embodiments, the fishing lure may include two sides configured to fit around a center piece tied to a fishing line, whereby a fisherman may quickly changes the sides of the fishing lure by separating the sides from the center piece and assembling two other sides to the center piece. In further embodiments, the center piece may be positioned on the interior of the sides such that a portion of the fishing line is hidden within the fishing lure, thereby improving the fishing lure's presentation by attaching the fishing line to the fishing lure internally instead of to an external protrusion (e.g., a snap swivel) on conventional fishing lures.

17 Claims, 16 Drawing Sheets

INTERCHANGEABLE FISHING LURE SYSTEM

RELATED APPLICATIONS

This application claims the benefit of priority to U.S. Provisional Application No. 61/885,626 entitled "Interchangeable Fishing Lure System" filed Oct. 2, 2013, the entire contents of which are hereby incorporated by reference.

BACKGROUND

Successful fishermen have an understanding of how to adapt their fishing strategies during an outing in order to catch fish that may be attracted to different stimuli, such as movement, vibration, sound, flash, scent, and/or color. When a fisherman is unsuccessful fishing a certain area with a particular type of fishing lure (e.g., fishing on the surface of the water with a surface lure), the fisherman may switch to another type of lure to use a different method of attracting fish (e.g., fishing near the bottom of the water with a jig). Thus, because of the great diversity of fishing lures and their ability to attract fish using several different techniques, fishermen typically include more than one type of fishing lure in their fishing tackle and frequently switch fishing lures to increase their odds of catching a fish.

SUMMARY

Various embodiments provide a fishing lure configured to allow a fisherman to quickly change fishing lures without having to cut the line or use a snap connection.

In some embodiments, the fishing lure may include a lure body that includes a first side, a second side configured to engage the first side, a first channel formed within the first side, a second channel formed within the second side and configured to form a chamber when the first side engages the second side, the chamber encapsulating a center piece and a portion of a fishing line. In some embodiments, the fishing lure may include the center piece configured to fit within the chamber and be attached to the fishing line.

In some embodiments, the lure body may be configured to separate into the first side and the second side to enable removal of the center piece.

In some embodiments, the first and second channels and the center piece may be configured to form an opening at a front of the lure body to allow the fishing line to exit the lure body and to conceal the center piece and a portion of the fishing line when the fishing lure is assembled.

In some embodiments, the lure body may be configured to resemble one of a jig lure, a surface lure, a plug lure, a popper lure, a stickbait lure, a top-water lure, a crankbait lure, and a minnow lure.

In some embodiments, the center piece may be configured to bear external pulling forces acting on the fishing lure.

In some embodiments, the first side may include at least one first fastener, the second side may include at least one second fastener, and the at least one first fastener and the at least one second fastener may be configured to physically engage in order to hold the first side together with the second side.

In some embodiments, the fishing lure may include a connector piece attached to the first side and the second side and configured as a hinge to enable the first side and the second side to be joined together.

In some embodiments, the first side may include a first rubber interior edge, the second side may include a second rubber interior edge, and the first rubber interior edge and the second rubber interior edge may be configured to engage in order to prevent water from entering the interior of the lure body.

In some embodiments, the first side may include a first recess, the second side may include a second recess, and the first recess and the second recess may be configured to engage to form a compartment inside the lure body configured to enclose at least one of a rattler, a weight, an air-bladder, and a scent pouch.

In some embodiments, the first side may include a first diver bill portion, the second side may include a second diver bill portion, and the first diver bill portion and the second diver bill portion may be configured to engage to form a diver bill.

In some embodiments, the center piece may be configured to rotate within the lure body.

In some embodiments, the center piece may include a center-piece body and an eyelet attached to the center-piece body and the fishing line.

In some embodiments, the eyelet may be configured to rotate around the center-piece body.

In some embodiments, the center piece may be configured to fit inside the first side and the second side via at least one of magnetic attraction and friction.

In some embodiments, the center piece, the first side, and the second side may be in a fixed position relative to each other when the fishing lure is assembled.

In some embodiments, the center piece may include at least two male insert protrusions, the first side may include at least one female insert cavity in the first channel configured to receive at least one male insert protrusion of the center piece, the second side may include at least one female insert cavity in the second channel configured to receive at least one male insert protrusion of the center piece, and the center piece may be further configured to lock the center piece, the first side, and the second side in a fixed position relative to each other when the at least two male insert protrusions are inserted into the at least one female insert cavity of the first side and the at least one female insert cavity of the second side.

In some embodiments, the first side may include at least one magnetic component, the second side may include at least one magnetic component, and the first side and the second side may be configured to hold the first side and the second side together through magnetic attraction of their respective magnetic components when the fishing lure is assembled.

In some embodiments, the at least one magnetic component of the first side may be a first magnetic rim on the interior of the first side, the at least one magnetic component of the second side is a second magnetic rim on the interior of the second side, and the first magnetic rim and the second magnetic rim may be configured to engage via magnetic attraction in order to hold the first side together with the second side.

In some embodiments, one of the first side and the second side may further include at least one hook.

In some embodiments, the at least one hook may be configured to hang down a center line of the lure body.

BRIEF DESCRIPTION OF THE DRAWINGS

The accompanying drawings, which are incorporated herein and constitute part of this specification, illustrate

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As discussed above, avid fishermen typically utilize many different types of fishing lures in a single outing to maximize their chances of catching fish. While switching fishing lures may increase a fisher's odds of attracting a fish, the fisherman must spend a nontrivial amount of time switching fishing lures. Typically, to switch conventional fishing lures, the fisherman must cut the line tied to the old lure and tie the line to the new lure. This process may be made considerably more difficult (and potentially even dangerous) because of several factors, including difficulty seeing the fishing lures in low light (e.g., night fishing), wet or slippery hands, or involuntary movement (e.g., rocking in a boat).

Further, fishermen who use conventional fishing lures must tie their lines to mechanisms such as swivels or snap swivels protruding from the front of such fishing lures, and these protrusions may negatively affect the fishing lure's presentation in the water, thereby making the fishing lure less effective at attracting fish. For instance, a snap swivel attached to the front of a conventional fishing lure may distract or alarm a nearby fish, and thus may dissuade the fish from striking the fishing lure.

To address these and other limitations of conventional fishing lures, the various embodiments provide a fishing lure configured to allow a fisherman to quickly change fishing lures without having to cut the line or use a snap connection. In the various embodiments, the fishing lure may include two sides having interior cavities configured to fit around a center piece that is tied to the fishing line. The embodiments enable a fisherman to quickly change the fishing lure by separating the sides of the lure from the center piece and assembling two sides of another fishing lure about the center piece. In further embodiments, the center piece may be positioned on the interior of the sides of the fishing lure such that a portion of the fishing line is hidden within the fishing lure, thereby eliminating the need for an external eyelet and improving the fishing lure's presentation.

Figure 1A:
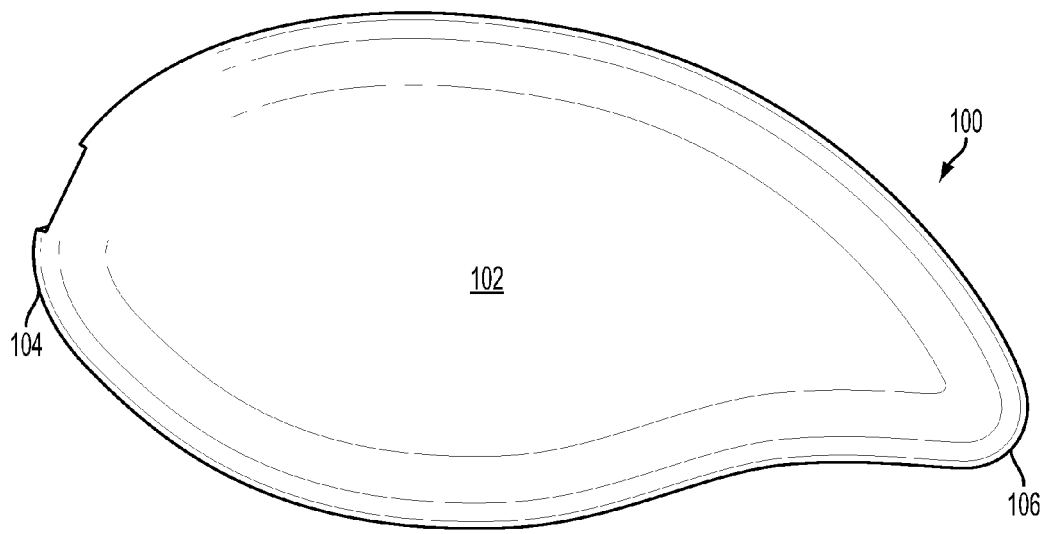
FIG. 1A is an exterior view of a right side of an embodiment fishing lure.
Figure 1B:
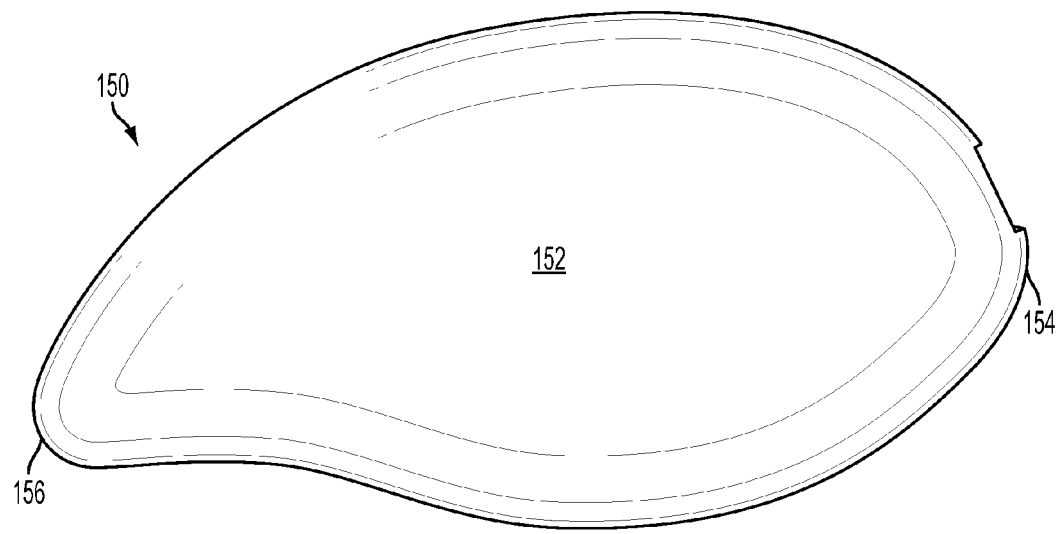
FIG. 1B is an exterior view of a left side of an embodiment fishing lure.

FIG. 1A illustrates an exterior view of a right side 100 of an embodiment fishing lure. The right side 100 may have an anterior side 104, a posterior side 106, and an exterior side 102. FIG. 1B illustrates an exterior view of a left side 150 of the embodiment fishing lure. The left side 150 may be a mirror image of the right side, having an anterior side 154, a posterior side 156, and an exterior side 152. The right side 100 and the left side 150 may be made of various types of material, such as one or more of wood, metal, rubber, ceramics, and plastic, as well as any combination of those materials. In an embodiment, the shapes of the right side 100 and the left side 150 may be mirror images of each other.

Figure 8A:
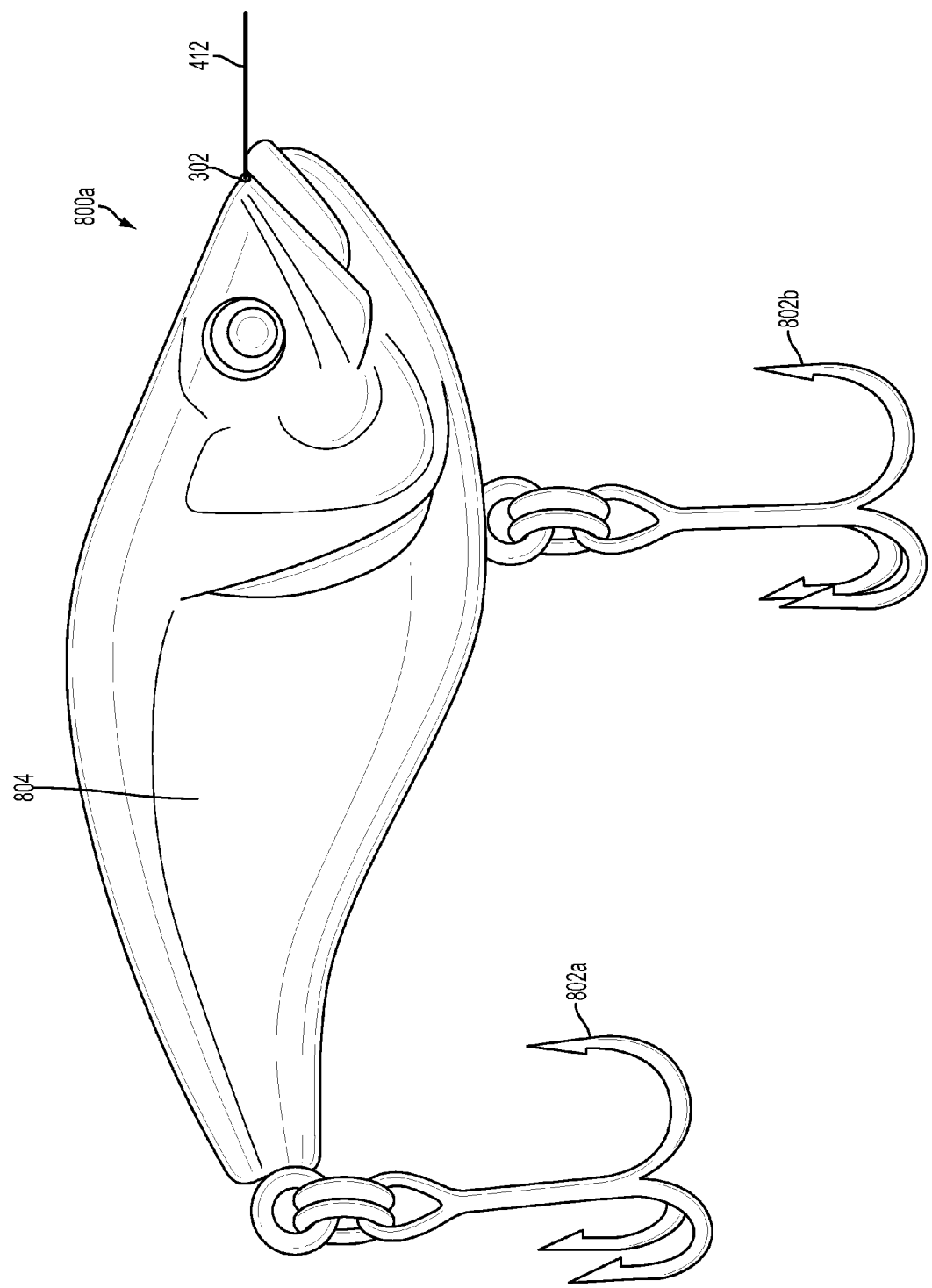
FIGS. 8A-8B are side exterior views of embodiment fishing lures.
Figure 8B:
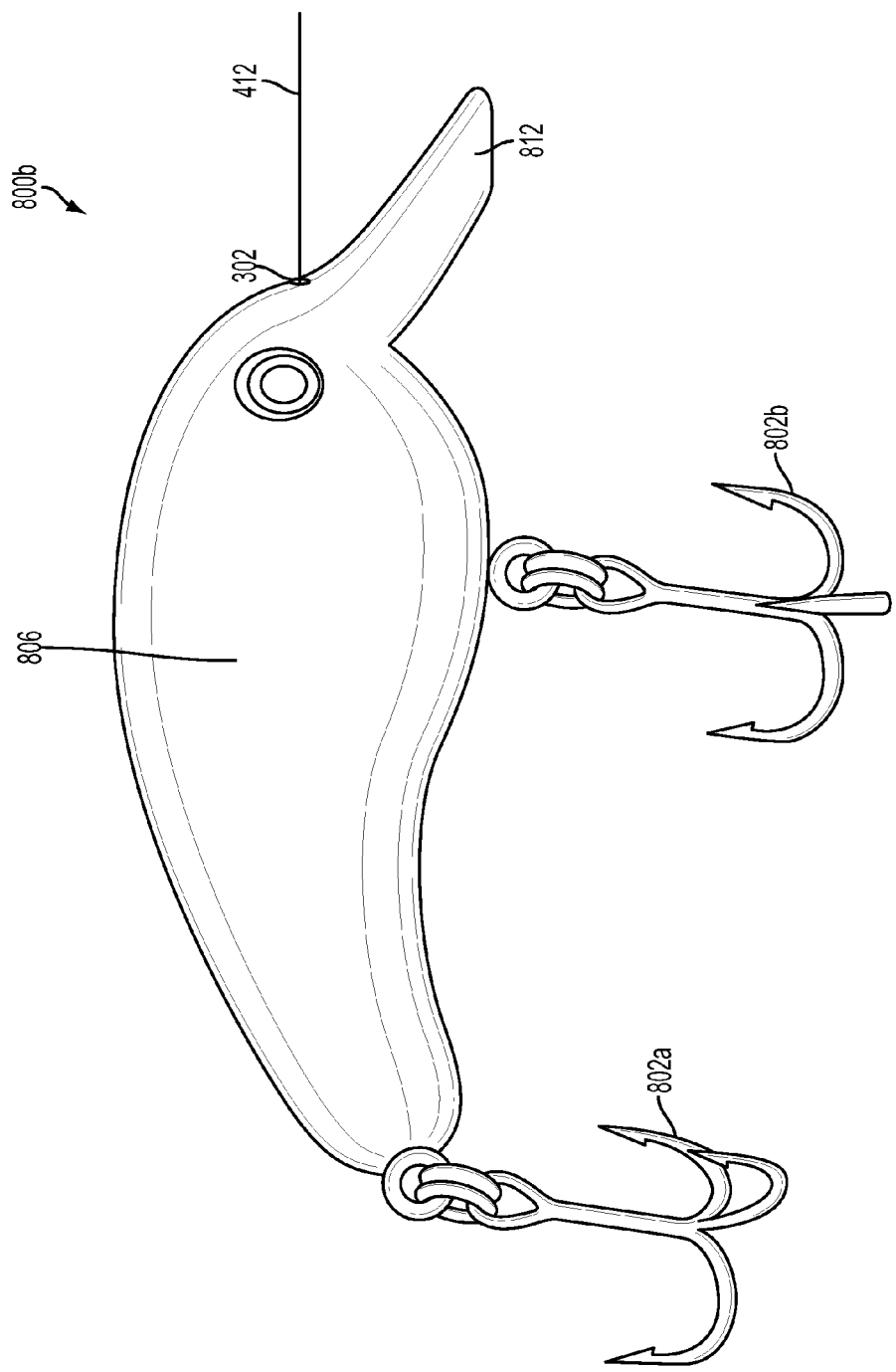

In an embodiment, the left side 150 and the right side 100 may be aesthetically configured to resemble the left and right sides of a bait, such as conventional poppers, stickbait, crankbaits, plug baits, etc. Thus, the left side 150 and right side 100 may be configured to engage or otherwise join together to resemble the exterior of a fully formed conventional bait as illustrated in FIGS. 8A and 8B described below.

Figure 2A:
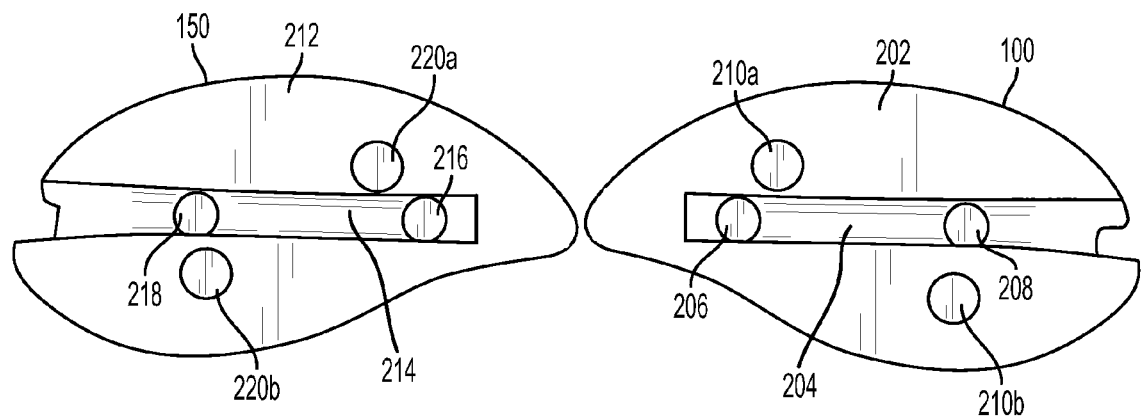
FIGS. 2A-2D are interior views of a right side and left side of alternative embodiment fishing lures.

FIG. 2A is an interior view of an embodiment right side 100 of a fishing lure and an embodiment left side 150 of the fishing lure. The right side 100 may have an interior side 202, and the left side 150 may have an interior side 212.

The right side 100 may include a right channel 204, which may be a hollowed-out portion of the interior side 202 that opens to the exterior of the right side 100. Similarly, the left side may include a left channel 214, which may be a hollowed-out portion of the interior side 212 that opens to the exterior of the left side 150. In an embodiment, the left channel 214 and the right channel 204 may be configured to complement one another to form an interior cavity that forms around and securely holds a separate center piece when the left side 150 and the right side 100 are affixed together as further described below with reference to FIGS. 5A-6E.

The interior side 202 of the right side 100 may also include a first female insert cavity 206 that may be a cavity or excavated portion of the interior side 202 within the right channel 204 (i.e., an inset within the right channel 204). The interior side 202 of the right side 100 may also include a second female insert cavity 208 configured as another cavity or excavated portion of the interior side 202. In a further embodiment, the interior side 202 of the right side 100 may include one or more additional female insert cavities at different locations within the right channel 204.

Figure 2B:
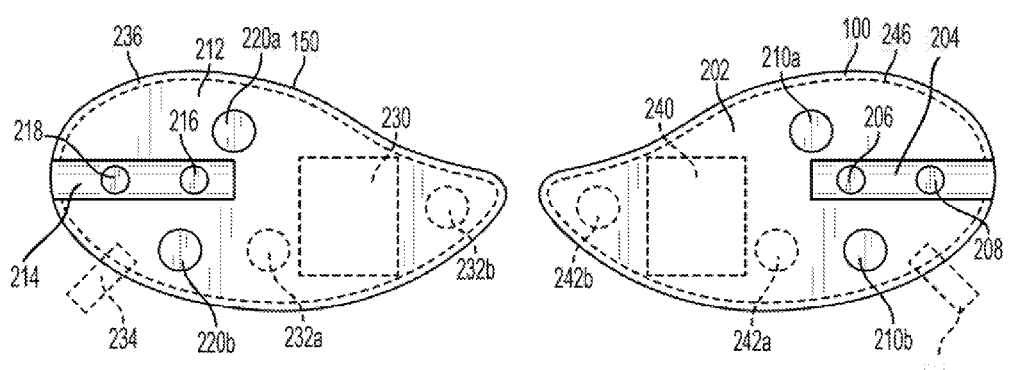

In an embodiment, the interior side 202 may include one or more magnetic components—such as magnetic components 210a, 210b—embedded within the interior side 202 of the right side 100 and configured to magnetically attach to one or more magnetic components embedded within the interior side 212 of the left side 150 (e.g., magnetic components 220a, 220b). In an embodiment, the one or more magnetic components 210a, 210b, 220a, 220b may be configured to hold the right side 100 to the left side 150 when joined together with a binding force of 1 to 2 pounds, and may be configured in various shapes (e.g., blocks, discs, etc.) to accommodate the shape of the fishing lure. As illustrated in FIG. 2B below, the interior side 202 of the right side 100 may also be configured to include one or more optional magnetic components 242a, 242b embedded within the interior side 202 and one or more optional magnetic components 232a, 232b embedded within the interior side 212 of the left side 150.

Returning to FIG. 2A, in an embodiment, the interior side 212 of the left side 150 may be configured to complement the interior side 202 of the right side 100, such as a mirror image of the interior side 202 of the right side 100. As such, the interior side 212 of the left side 150 may be configured to include one or more magnetic components 220a, 220b and one or more female cavities 216, 218 configured to match up with the one or more female cavities 206, 208 in the right side 100.

FIG. 2B illustrates another view of the interior side 202 of the right side 100 and the interior side 212 of the left side 150 according to another embodiment.

In an embodiment, the interior 202 of the right side 100 may be configured to include a right recess 240. The right recess 240 may be a hollowed-out portion of the interior side 202 of the right side 100 of various sizes and shapes. In the example illustrated in FIG. 2B, the right recess 240 is in the form of a rectangular cavity within the interior side 202 of the right side 100. The interior 212 of the left side may similarly be configured to include a left recess 230 that complements the interior side 212 of the right recess 240. When the right side 100 and left side 150 are joined together, the right recess 240 and the left recess 230 form a cavity or compartment (e.g., as described below with reference to FIG. 3) capable of holding items within the fishing lure body, such as a rattler or scent pouch.

Figure 3:
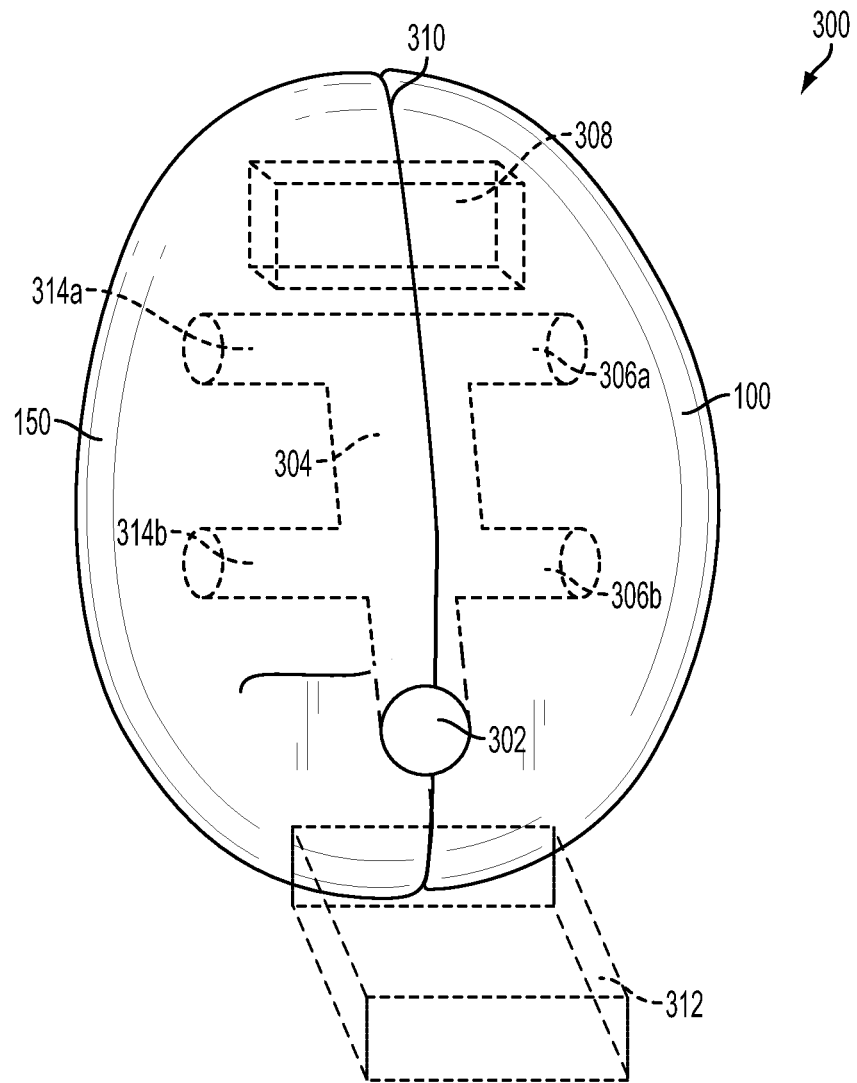
FIG. 3 is a cutaway front view of a lure body of an embodiment fishing lure.

In another embodiment, the interior side 202 of the right side may include a right portion of a diver bill 244. The interior side 212 of the left side 150 may include a left portion of a diver bill 234 configured to combine with the right portion of the diver bill 244 to form a complete diver bill when the two halves are joined together as illustrated in FIG. 3.

In another embodiment, the interior side 202 of the right side 100 may include a right rim 246 configured to run along the edge of the interior side 202 as illustrated in FIG. 2B. The interior side 212 of the left side 150 may be configured to include a left rim 236 configured to magnetically attach to the right rim 246 when the right side 100 and the left side 150 are joined together. The left rim 236 and the right rim 246 may be comprised of a water-proof material (e.g., rubber) such that the left rim 236 and right rim 246 function to prevent water from entering the interior of the fishing lure.

Figure 2C:
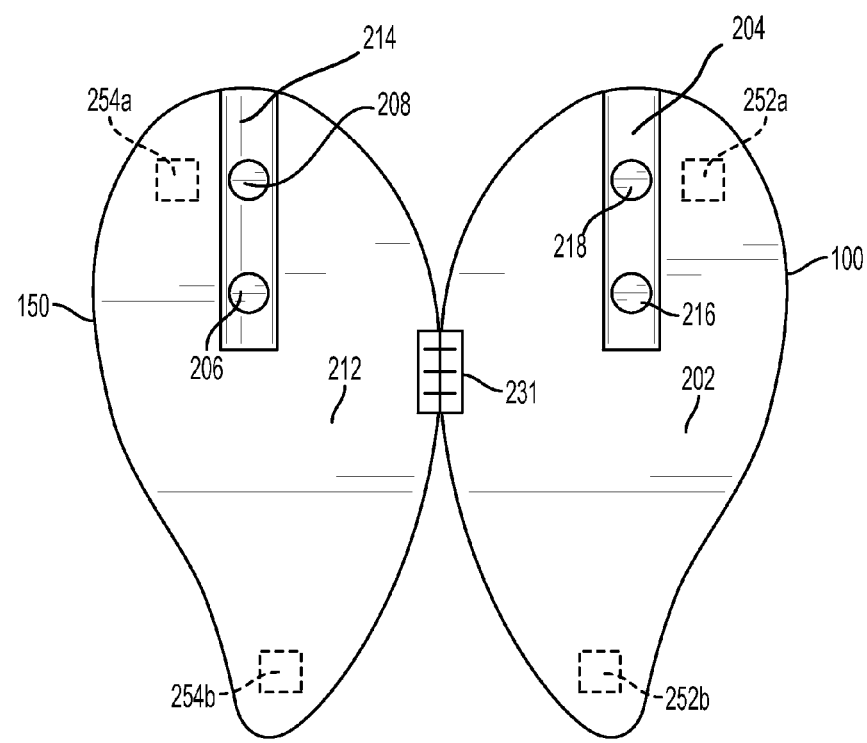

FIG. 2C illustrates another view of the interior sides 202, 212 of the right side 100 and the left side 150, respectively, according to another embodiment that includes a connector piece 231 configured to fasten the top of the right side 100 to the top of the left side 150. The connector piece 231 may also be configured to act as a hinge to enable the left side 150 and the right side 100 to be joined together such that the interior side 202 of the right side 100 and the interior side 212 of the left side 150 are facing each other when the left side 150 and the right side 100 are joined together.

The fishing lure may also include one or more fasteners to keep the right side 100 and the left side 150 joined together. In the example illustrated in FIG. 2C, one or more fasteners 252a, 252b may be included on the interior side 202 of the right side 100, and one or more fasteners 254a, 254b may be attached to the left side 150 and may be configured to affix to the one or more fasteners 252a, 252b on the interior side 202 of the right side 100, such as by friction, mechanically (e.g., clips, snaps, etc.), or magnetically. In an embodiment, the one or more fasteners, 252a, 252b, 254a, 254b may be configured to hold the left side 150 flush with the right side 100.

Figure 2D:
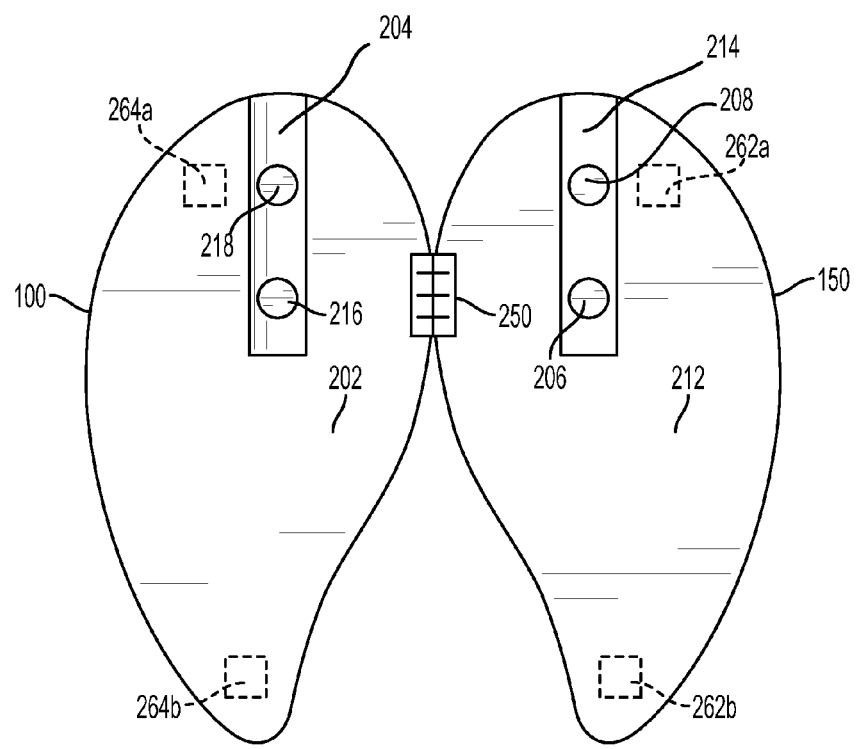

FIG. 2D illustrates another view of the interior sides 202, 212 of the right side 100 and the left side 150, respectively, in an embodiment that includes a connector piece 250 configured to fasten the bottom of the right side 100 to the bottom of the left side 150. The connector piece 250 may also be configured to act as a hinge to enable the left side 150 and the right side 100 to be joined together such that the interior side 202 of the right side 100 and the interior side 212 of the left side 150 as described above with reference to the connector piece 231 described with reference to FIG. 2C.

The fishing lure may also include fasteners 262a, 262b attached to the interior side 212 of the left side 150 and configured to join with fasteners 264a, 264b attached to the interior side 202 of the right side 100 as described above with reference to FIG. 2C.

FIG. 3 is a cutaway front view of a lure body 300 of an embodiment fishing lure with the right side 100 and left side 150 affixed together about a common axis 310. In various embodiments, the left side 150 and the right side 100 may be mirror images of each other. The left side 150 and the right side 100 may be joined together in such a way that the lure body 300 appears to be one solid piece. As such, in an embodiment, the left side 150 and the right side 100 may be configured to be flush with the other when joined together.

The lure body 300 may include a chamber 304 formed by the combination of the right channel 204 and the left channel 214 in the right side 100 and left side 150, respectively. The chamber 304 may be a cavity or empty space within the lure body 300 and may be configured to be positioned within the lure body 300 to form an opening 302 where one end of the chamber 304 is exposed to the outside of the front of the lure body 300. In an embodiment, the opening 302 may be configured to allow a fishing line (not shown) to pass through the opening 302 to reach inside of the lure body 300 as further described below with reference to FIG. 5A.

The lure body 300 may also include one or more female insert cavities as described above with reference to FIG. 2A. In the example illustrated in FIG. 3, the lure body 300 may include one or more female insert cavities 306a, 306b included in the right side 100 (e.g., female insert cavities 206, 208 illustrated above in FIG. 2A) and female insert cavities 314a, 314b included in the left side 150 (e.g., female insert cavities 216, 218 illustrated above in FIG. 2A).

In an optional embodiment, the lure body 300 may include an optional compartment 308 formed as a combination of the left recess 230 in left side 150 and the right recess 240 in the right side 100 when the left side 150 and the right side 100 join together to form the lure body 300. The optional compartment 308 may securely hold various items within the lure body 300, such as lead weights, air-filled bladders, scent pouches, and noise-making devices (e.g., rattlers).

In another optional embodiment, the lure body 300 may include an optional diver bill 312 formed as the combination of a left diver bill portion 234 included on the left side 150 and from a right diver bill portion 244 included on the right side 100. In an optional embodiment, the optional diver bill 312 may enable the lure body 300 to serve as any of a crankbait, a wobbler, a minnow, a shallow-diver, or a deep-diver. Another view of the diver bill 312 is illustrated in FIG. 8B.

Figure 4:
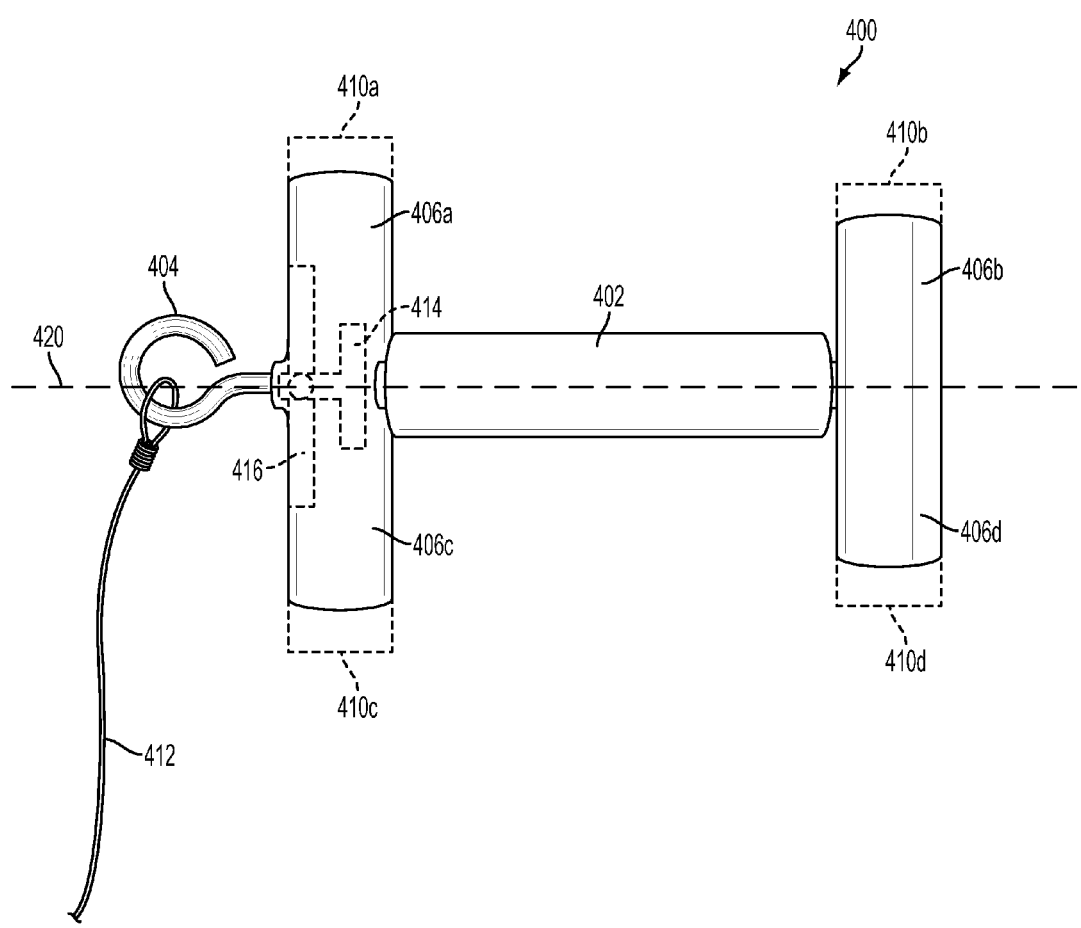
FIG. 4 is a top view of a center piece of an embodiment fishing lure.

FIG. 4 is a top view of a center piece 400 configured for use with the lure body 300. In an embodiment, the center piece 400 may include a center-piece body 402, an eyelet 404, and one or more male insert protrusions (e.g., male insert protrusions 410a-410b). The center-piece body 402 may be configured to serve as a base for the male insert protrusions 410a-410d and the eyelet 404.

The eyelet 404 may be configured to hold a fishing line 412 that is tied on the eyelet 404. In an optional but preferable embodiment, the eyelet 404 may be configured to serve as a swivel or snap swivel and thus may include a support structure 416 that supports a pivoting joint 414, such as a ball or barrel. In such an optional embodiment, the eyelet 404 may be configured to freely rotate 360 degrees along an axis 420. In another embodiment, the vertical axis 420 may run parallel to the center-piece body 402 as illustrated in FIG. 4 so that the eyelet 404 may freely rotate when a pulling force is applied to the center piece 400 via the fishing line 412.

The male insert protrusions 406a-d may be configured to protrude from the center-piece body 402. While illustrated in FIG. 4 as being cylindrical, the male insert protrusions 406a-d may be various other shapes. As further described below with reference to FIG. 5A, the male insert protrusions 406a-d may be configured to be inserted into female insert cavities on the interiors of the left side 150 and right side 100 to hold the center piece 400 in a fixed position within the body of the fishing lure.

In an optional embodiment, one or more of the male insert protrusions 406a-406d may include an optional magnetic component (e.g., optional magnetic components 410a-d) positioned at the end of the one or more male insert protrusions 406a-406d. The optional magnetic components 410a-410d may be configured to magnetically attach to other magnetic components embedded within the female insert cavities in the left side 150 and the right side 100.

In an embodiment, the center piece 400 may be configured to be one solid piece. In another embodiment, the center piece 400 may be comprised of multiple pieces. In further embodiments, the center piece (either comprised of one or multiple pieces) may be made of various types of materials, include one or a combination of metal, wood, plastic, magnetic material, etc. For example, the center piece 400 may include two pieces, such as a metal eyelet 404 and a plastic center-piece body 402.

Figure 5A:
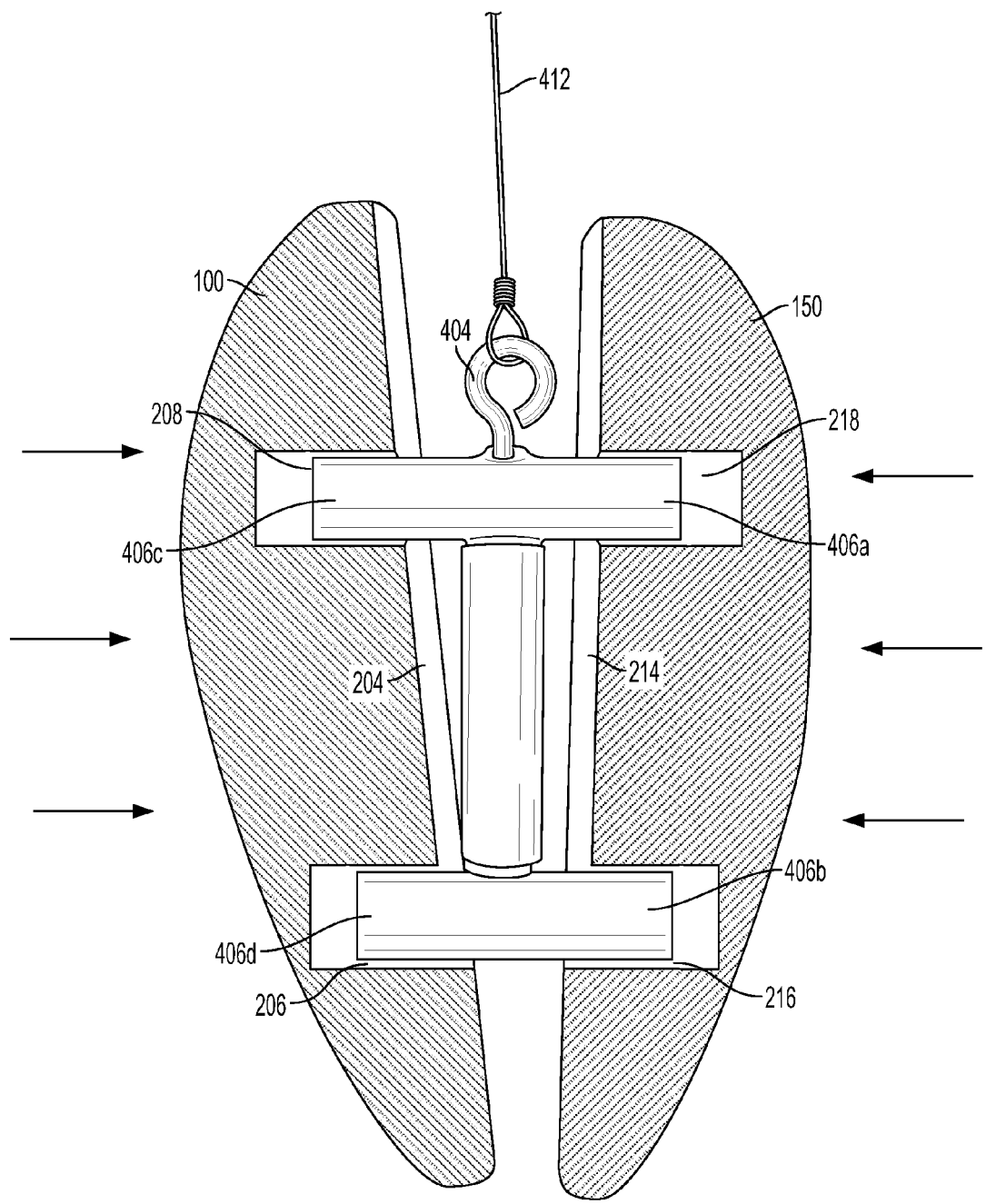
FIG. 5A is a cutaway view of a partially-assembled embodiment fishing lure.

FIG. 5A is an cutaway view of a partially assembled fishing lure 500 illustrating the relative positioning of the center piece 400, the left side 150, and the right side 100.

In an embodiment, the right side 100 and the left side 150 may be configured to enclose the center piece 400 when joined together such that the center piece 400 may be housed in the chamber (not shown) formed from the combination of the right channel 204 and the left channel 214. The center piece 400 may be configured to fit within the lure body (i.e., the combined left side 150 and right side 100 as illustrated in FIG. 3) such that the eyelet 404 and a portion of the fishing line 412 may be positioned near the opening 302 as described above with reference to FIG. 3.

In an embodiment, the male insert protrusions 406a-406d included on the center piece 400 may be configured to be inserted into the female insert cavities 216, 218 on the left side 150 and the female insert cavities 206, 208 on the right side 100. The male insert protrusions 406a-406d and the female insert cavities 206, 208, 216, 218 may be held together in place via friction or magnetic attraction. Once inserted into the female insert cavities 206, 208, 216, 218, the male insert protrusions 406a-406d may keep the orientation and position of the center piece 400 fixed with respect to both the right side 100 and the left side 150. In other words, the male insert protrusions 406a-406d may keep the center piece 400 from moving within the lure body and may contribute to keeping the right side 100 and the left side 150 from coming apart or shifting positions. In another embodiment, by inserting the male insert protrusions 406a-406d into the female insert cavities 206, 208, 216, 218, the eyelet 404 may be oriented towards the front of the fishing lure 500.

In another embodiment, the center piece 400 may take the load off of the right side 100 and left side 150 of the lure body when external force is applied to the fishing lure 500. For example, the center piece 400 may be configured to bear a force pulling on the fishing line 412 and/or the force of a fish pulling on the fishing lure 500.

In further embodiments, the center piece 400 may be configured to be inserted within various types of fishing lure bodies. As such, a fisherman may quickly and easily change the type of lure used by removing the left and rights sides of the lure body from around the center piece 400 and inserting the center piece 400 into a different pair of sides. For example, the center piece 400 may be inserted within a lure body configured as a surface lure, and the fisherman may quickly remove the lure body from around the center piece 400 and insert the center piece into another lure body configured to function as a jig. Thus, the fisherman may quickly switch out an old fishing lure without having to cut the line and tie on the new fishing lure.

Figure 5B:
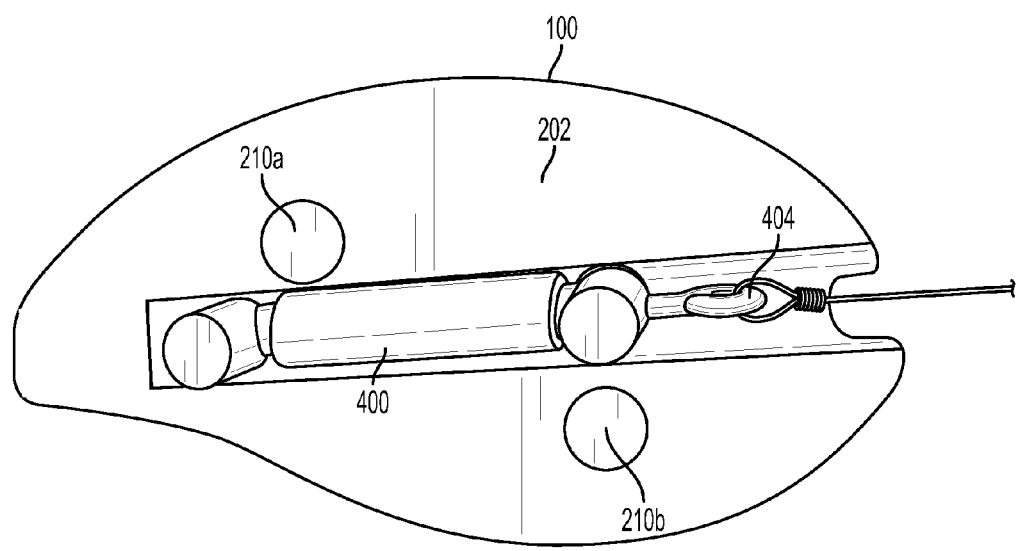
FIG. 5B is an interior view of a center piece embedded within a right side of an embodiment fishing lure.

FIG. 5B is a cutout view of the fishing lure 500 illustrating the positioning of the center piece 400 when inserted into the right side 100. As discussed above with reference to FIG. 5A, the center piece 400 may be configured to be inserted into the right side 100 and the left side 150 via male insert protrusions, and the center piece 400 should securely rest within the right channel 204 and left channel 214 of the right side 100 and left side 150, respectively.

Figure 6A:
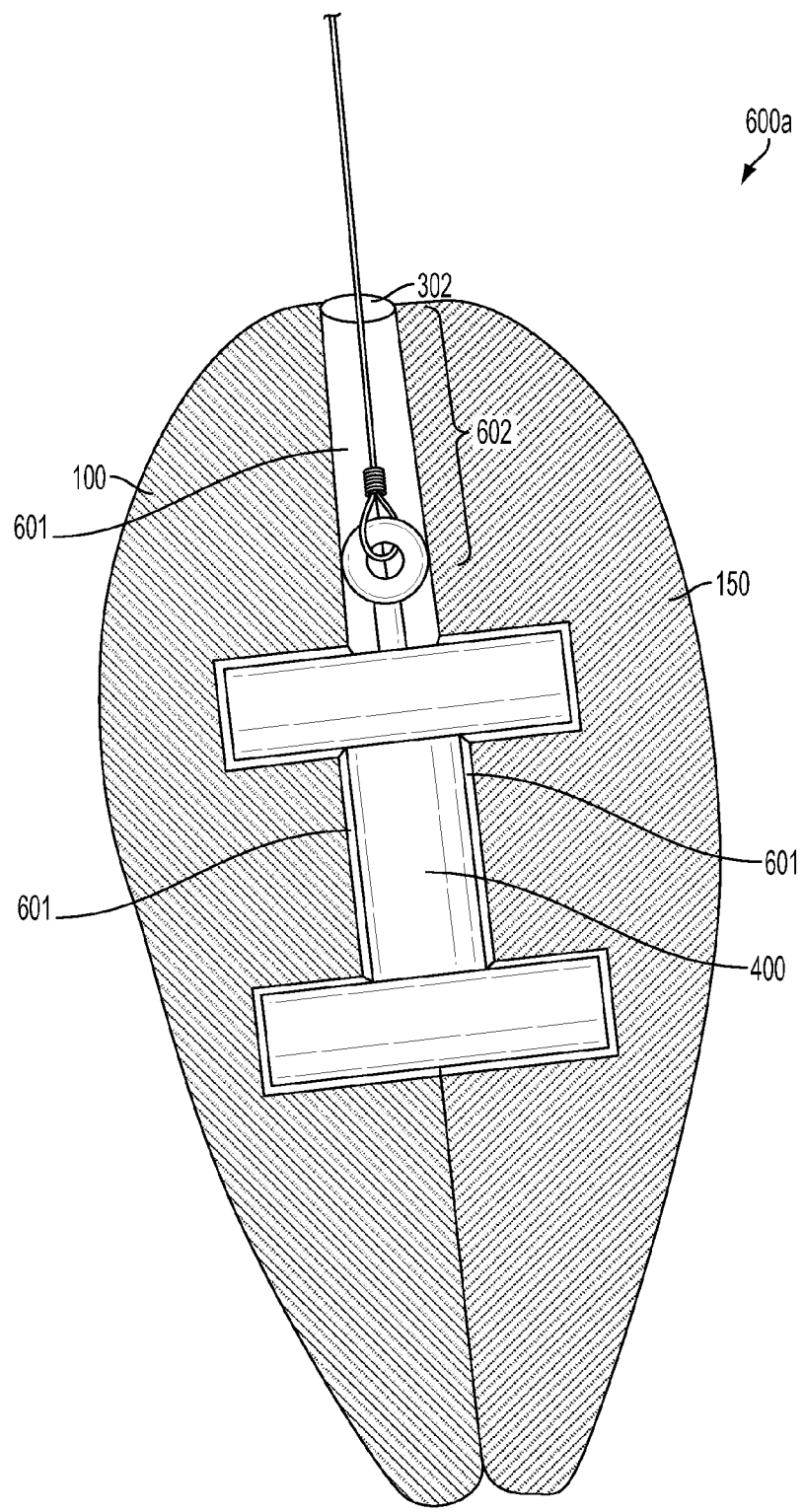
FIGS. 6A-6E are cutaway views of alternative embodiment fishing lures.

FIG. 6A is a cutaway diagram illustrating the top of a fully assembled fishing lure 600a with a right side 100, a left side 150, and a center piece 400 securely embedded between the right side 100 and the left side 150.

As described above, the right side 100 and the left side 150 may be assembled together such that the center piece 400 is enclosed with the chamber 601 formed from the left channel and the right channel. The right side 100 and the left side 150 may also be configured to join together such that the opening 302 of the chamber 601 allows a fishing line 412 attach to the eyelet 404 of the center piece 400 and exit the front of the fishing lure 600a. In the various embodiments, a portion of the fishing line 412 may be concealed within the lure body (i.e., a hidden portion 602), thereby enhancing the presentation of the fishing lure 600a because the line is attached on the inside of the fishing lure 600a instead of to a swivel or other exterior connection as used in conventional fishing lures.

Figure 6B:
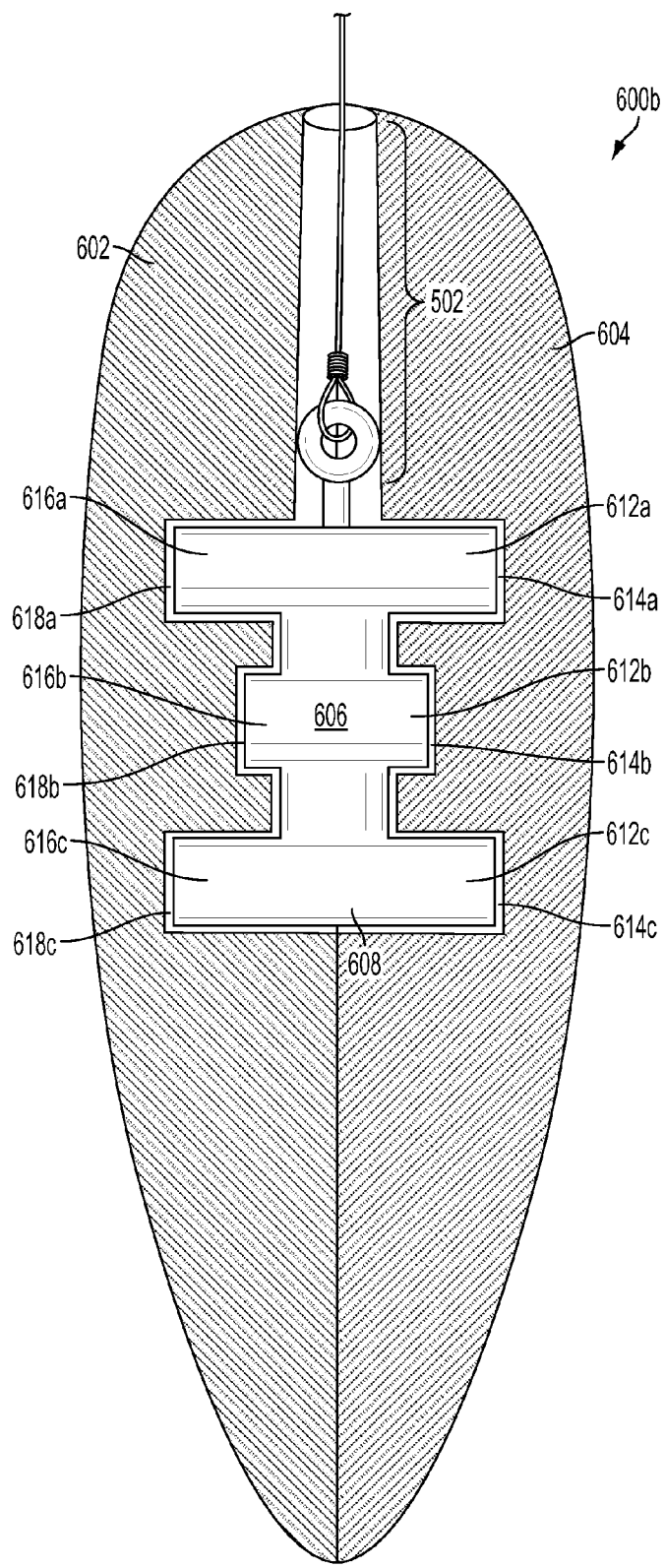

FIG. 6B is a top view of a cutaway diagram illustrating another embodiment fishing lure 600b with alternative designs for the center piece 606, the left side 604, and the right side 602. The center piece 606 may have multiple male insert protrusions configured to extend at varying lengths from the center-piece body 608 to form the shape illustrated in FIG. 6B. In an embodiment, the right side 602 may be configured to include multiple female insert cavities 618a-618c within the interior of the right side 602 and configured to receive the male insert protrusions 616a-616c. Similarly, the left side 604 may be configured to include multiple female insert cavities 614a-614c within the interior of the left side 604 and configured to receive male insert protrusions 612a-612c.

In an embodiment, the center piece 606 may include multiple male insert protrusions, and the right side 602 and the left side 604 may include multiple corresponding female insert cavities in order to increase the surface area on which the right side 602 and the left side 604 are respectively in contact with the center piece 606. As a consequence of increasing said surface area, the center piece may experience increased friction and have a better ability to stay attached to the right side and the left side. In another embodiment, by being configured to have multiple male insert protrusions, the center piece 606 may be have an increased ability to reduce movement among the right side 602, the left side 604, and center piece.

In another embodiment (not shown), the multiple male insert protrusions may be configured as a set of teeth-like protrusions resembling grooves in a key, and the right side and left side may have corresponding inserts to receive the teeth-like protrusions.

Figure 6C:
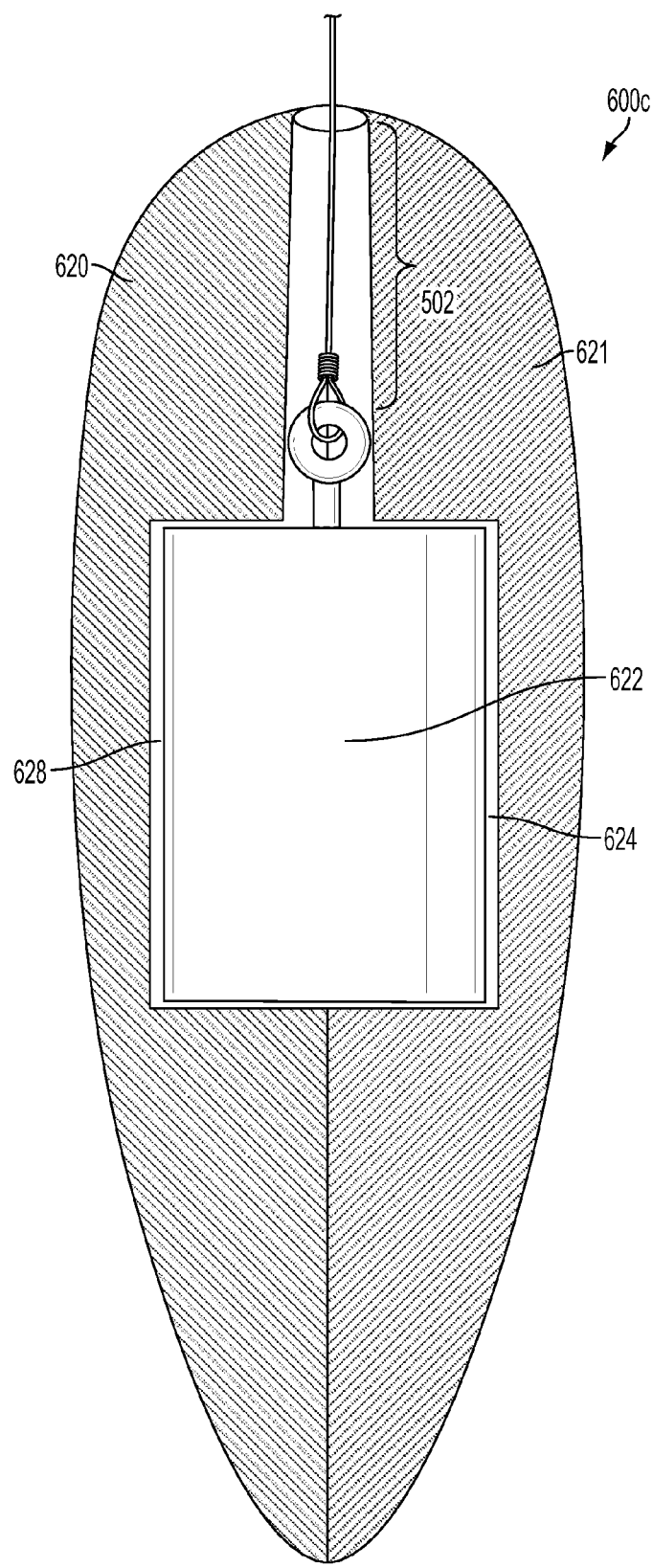

FIG. 6C is a top cutaway diagram illustrating another embodiment fishing lure 600c with alternative designs for the center piece and the sides. In an embodiment, the center piece 622 may be configured not to include male insert protrusions. Instead, center-piece body 626 may be configured to be in the shape of a rectangular prism and may be configured to serve as a single, large male insert protrusion by securely fitting into the a female insert cavity 628 of the right side 620 and a female insert cavity 624 of the left side 621. In such an embodiment, the female insert cavities 624, 628 may be configured to accommodate a rectangular prism, and the center piece 622 may be held in place within the fishing lure 600c. In another embodiment, the center piece 622 may be configured not to hold the left side 621 and the right side 620 together, and instead, the left side 621 and right side 622 may be configured to be held together by snaps, magnetic components, or other mechanisms included within the left side 621 and right side 620 as described in the above FIGs.

Figure 6D:
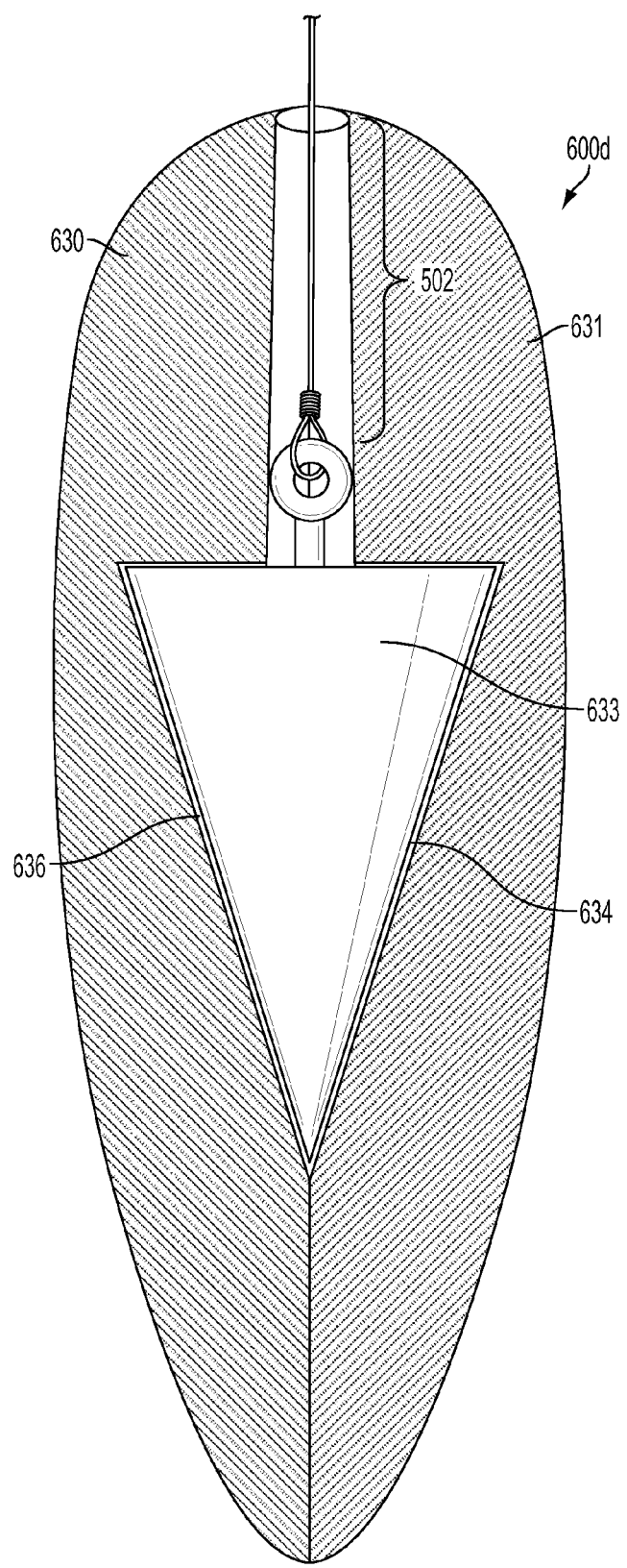

FIG. 6D is a top view cutaway diagram illustrating an embodiment fishing lure 600d with an alternative configuration for the center piece and the sides. In this embodiment, the center-piece body 633 of the center piece 632 may be in the shape of a cone. As described above with reference to FIG. 6C, center-piece body 626 may be configured to serve as a male insert protrusion by securely fitting into the female insert cavity 636 of the right side 630 and the female insert cavity 634 of the left side 631. In such an embodiment, the female insert cavities 634, 636 may be configured to accommodate the conical shape of the center-piece body 633, and the center piece 622 may be held in place within chamber formed from the female insert cavities 634, 636. In another embodiment, the center piece 632 may be configured not to hold the left side 631 and the right side 630 together, and instead, the left side 631 and right side 630 may be configured to be held together by snaps, magnetic components, or other mechanisms (not shown) included within the left side 631 and right side 630 as described in the above FIGs.

Figure 6E:
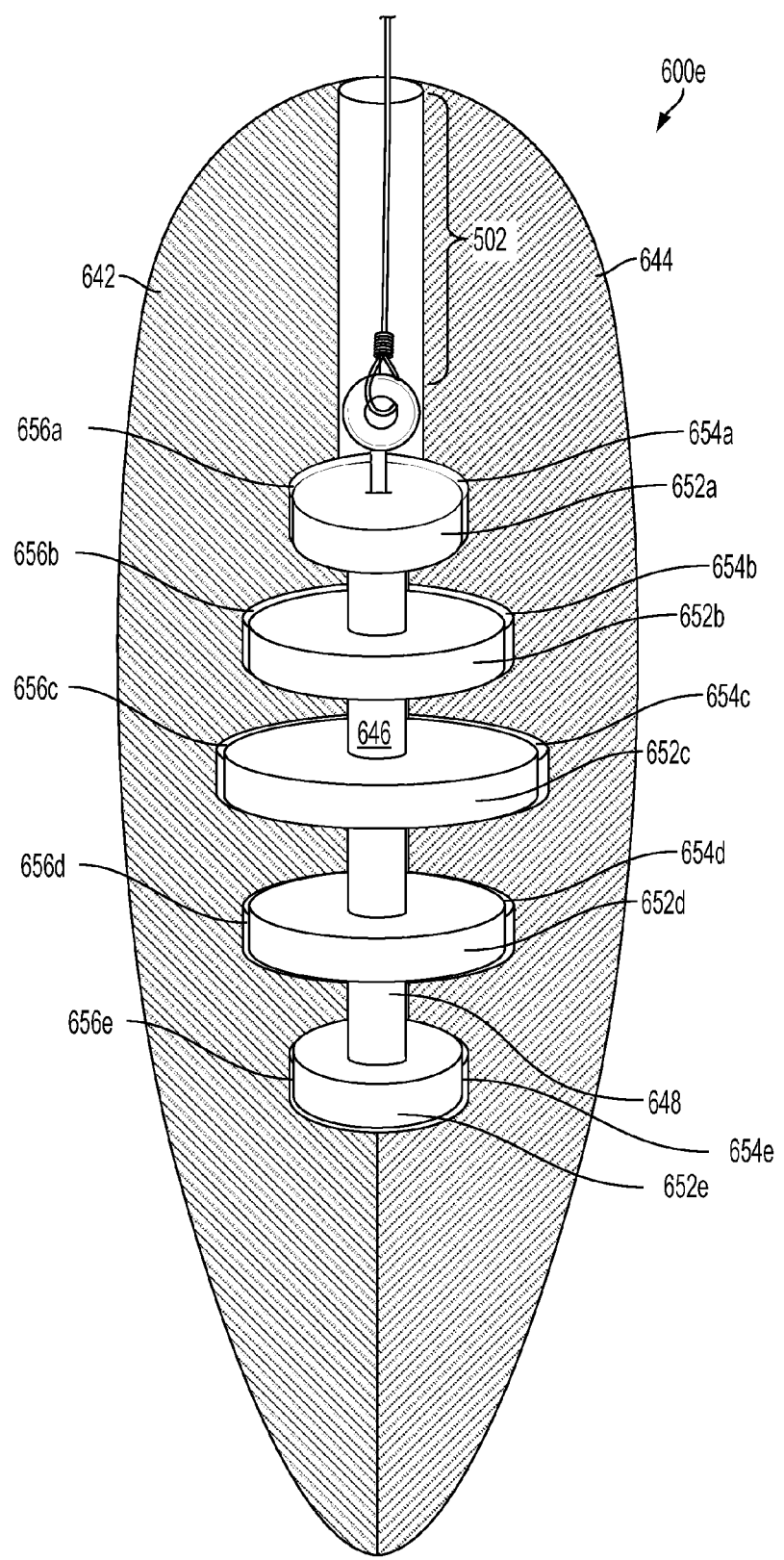

FIG. 6E is a top view of a cutaway diagram illustrating another embodiment fishing lure 600e with an alternative configuration for the center piece and the sides. In this embodiment, the center piece 646 may include one or more disc-shaped male insert protrusions (e.g., male insert protrusions 562a-562e) that may be configured to extend at varying lengths from the center-piece body 648 to form the shape illustrated in FIG. 6E. In an embodiment, the right side 642 may be configured to include one or more female insert cavities (e.g., female insert cavities 656a-656e) within the interior of the right side 642 and configured to receive the male insert protrusions 652a-652e. Similarly, the left side 644 may be configured to include one or more female insert cavities (e.g., female insert cavities 654a-654e) within the interior of the left side 644 and configured to receive male insert protrusions 652a-652e. In an embodiment, the male insert protrusions 652a-652e may be configured to fit securely into the female insert cavities 654a-654e and 656a-656e and may be particularly suited to hold the left side 644 together with the right side 642. In a further embodiment, the male insert cavities 654a-654e may securely fit into the female insert cavities 654a-654e and 656a-656e through friction and/or mutual magnetic attraction.

In another embodiment, the shape of the center piece 646 may be configured to conform to a rounded fishing lure body, such as the fishing lure body illustrated in FIG. 6E. In another embodiment, the shape of the center piece 646 may allow for a more natural movement of the fishing lure body as the fishing lure body rotates around the center piece 646 when the fishing lure 600e is being pulled through the water.

Figure 7A:
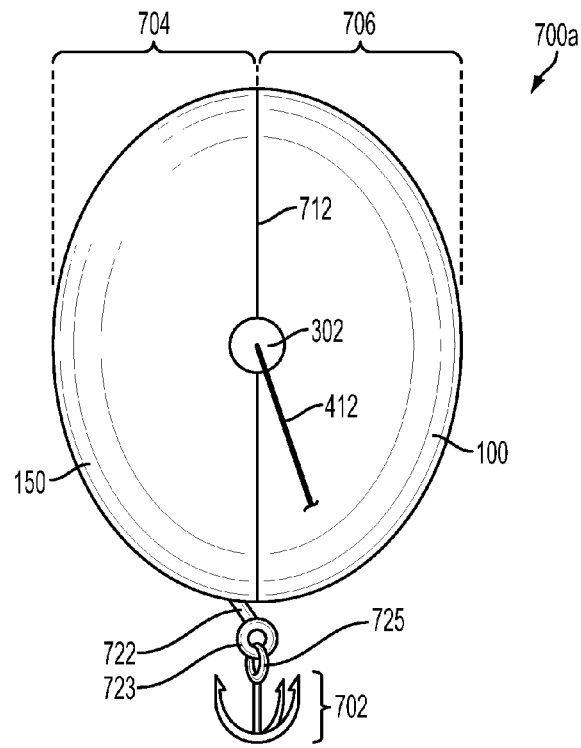
FIGS. 7A-7B are front exterior views of embodiment fishing lures.

FIG. 7A is a front exterior view of a fishing lure 700a illustrating the relative widths of a left side 150 and a right side 100.

In an embodiment, the right side 100 may be configured to have a width 704, and the left side 150 may be configured to have a width 706 that is equal to the width 704. For purposes of description, a dividing line 712 indicates the position of the left side 150 and right side 100. The right side 100 and left side 150 may be configured such that the dividing line 712 runs along the center of the fishing lure 700a, bisecting the opening 302 such that each portion of the opening on either side of the dividing line is equal in width. In another embodiment, the dividing line 712 may also indicate the approximate center of gravity of the fishing lure 700a.

In another embodiment, the fishing lure 700a may be configured to include one or more hooks 702. To attach the hook 702 to the fishing lure 700a, the left side 150 may be configured to include a hook connector 722. The hook connector 722 may include a hook eyelet 723 configured to interlock with a connector loop 725 included in the hook 702. In an embodiment, the hook connector 722 may be angled to enable the hook 702 to hang in the center of the fishing lure 700a (i.e., in line with the dividing line 712). In another embodiment (not shown), the hook connector 722 may instead be embedded within the right side 100 and angled in the opposite direction to enable the hook 702 to hang below the center of gravity of the fishing lure 700a.

Figure 7B:
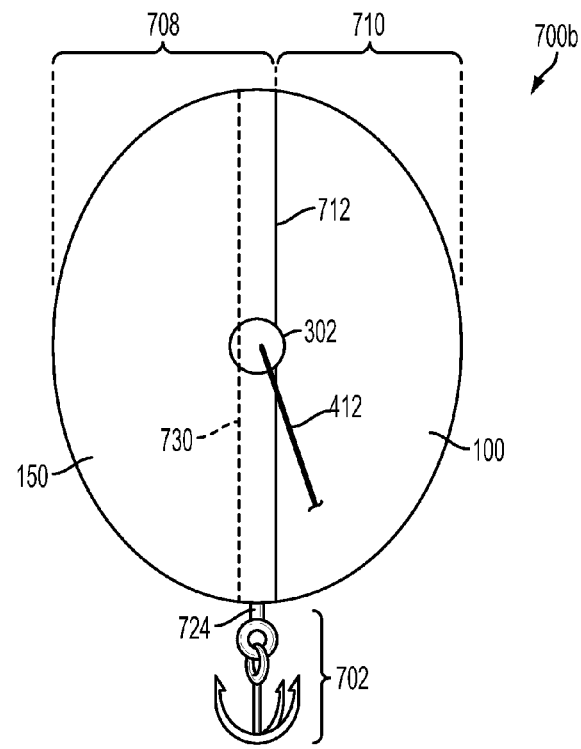

FIG. 7B is a front view of the exterior of an embodiment fishing lure 700b that may be configured to have one side that is a different width than the other. In an embodiment, the left side 150 may be configured to have a width 708, and the right side 100 may be configured to have a width 710 that is less than the width 708 of the left side 150. In such an embodiment, the dividing line 712 between the right side 100 and the left side 150 may be different than the center line 730 of the fishing lure 700b. In another embodiment, the fishing lure 700b may also include a hook connector 724 configured to hold a hook 702 such that the hook 702 hangs directly in line with the center line 730 of the fishing lure 700b.

FIG. 8A is an exterior view of an embodiment fishing lure 800a suitable for use in fishing. In an embodiment, the fishing lure 800a may resemble a conventional fishing lure. The fishing lure 800a may be configure to include one or more hooks 802a, 802b suitable for snaring fish or other aquatic animals and configured to be attached to and hang below the lure body 804 of the fishing lure 800a. In another embodiment, the fishing lure 800a may be configured such that the fishing line 412 emerges directly in front of the fishing lure 800a from the opening 302 such that the fishing lure 800a may be pulled forward through the water via the fishing line 412. Because the fishing line 412 is attached to the center piece (not shown) inside the fishing lure 800a, a portion of the fishing line 412 and mechanisms used to secure the fishing line 412 (e.g., an eyelet, swivel, etc.) may be hidden within the fishing lure 800a.

FIG. 8B is an exterior view of another embodiment fishing lure 800b suitable for use in fishing. The fishing lure 800b may be configure to include one or more hooks 802a, 802b suitable for snaring fish or other aquatic animals and configured to be attached to and hang below the lure body 806 of the fishing lure 800b. In another embodiment, the fishing lure 800a may be configured such that the fishing line 412 emerges directly in front of the fishing lure 800b from the opening 302. In another embodiment, the fishing lure 800b may include a diver bill configured to cause the fishing lure 800b to descend in the water when pulled via the fishing line 412.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the following claims and the principles and novel features disclosed herein. Further, any reference to claim elements in the singular, for example, using the articles "a," "an," or "the" is not to be construed as limiting the element to the singular.

What is claimed is:

1. A fishing lure comprising:
   a center-piece comprising an eyelet attached to the center-piece; and
   a lure body comprising:
     a first side;
     a second side configured to engage the first side;
     a first channel formed within the first side;
     a second channel formed within the second side and configured to form a chamber when the first side engages the second side, the chamber encapsulating the center piece and a portion of a fishing line, wherein the center piece is configured to fit within the chamber and configured to be attached to the fishing line via the eyelet.

2. The fishing lure of claim 1, wherein the lure body is configured to separate into the first side and the second side to enable removal of the center piece.

3. The fishing lure of claim 1, wherein the first and second channels and the center piece are configured to form an opening at a front of the lure body to allow the fishing line to exit the lure body and to conceal the center piece and a portion of the fishing line when the fishing lure is assembled.

4. The fishing lure of claim 1, wherein the lure body is configured to resemble one of a jig lure, a surface lure, a plug lure, a popper lure, a stickbait lure, a top-water lure, a crankbait lure, and a minnow lure.

5. The fishing lure of claim 1, wherein the center piece is configured to bear external pulling forces acting on the fishing lure.

6. The fishing lure of claim 1, wherein:
   the first side comprises at least one first fastener;
   the second side comprises at least one second fastener; and
   the at least one first fastener and the at least one second fastener are configured to physically engage in order to hold the first side together with the second side.

7. The fishing lure of claim 1, further comprising a connector piece attached to the first side and the second side and configured as a hinge to enable the first side and the second side to be joined together.

8. The fishing lure of claim 1, wherein:
   the first side comprises a first rubber interior edge;
   the second side comprises a second rubber interior edge; and
   the first rubber interior edge and the second rubber interior edge are configured to engage in order to prevent water from entering the interior of the lure body.

9. The fishing lure of claim 1, wherein:
   the first side comprises a first recess;
   the second side comprises a second recess; and
   wherein the first recess and the second recess are configured to engage to form a compartment inside the lure body configured to enclose at least one of a rattler, a weight, an air-bladder, and a scent pouch.

10. The fishing lure of claim 1, wherein:
    the first side comprises a first diver bill portion;
    the second side comprises a second diver bill portion; and
    wherein the first diver bill portion and the second diver bill portion are configured to engage to form a diver bill.

11. The fishing lure of claim 1, wherein the center piece is configured to rotate within the lure body.

12. The fishing lure of claim 1, wherein the eyelet is configured to rotate around the center-piece.

13. The fishing lure of claim 1, wherein one of the first side and the second side further comprises at least one hook.

14. The fishing lure of claim 13, wherein the at least one hook is configured to hang down a center line of the lure body.

15. A fishing lure comprising:
    a lure body comprising:
      a first side;
      a second side configured to engage the first side;
      a first channel formed within the first side; and
      a second channel formed within the second side and configured to form a chamber when the first side engages the second side, the chamber encapsulating a center piece and a portion of a fishing line,
    wherein:
    the center piece is configured to fit within the chamber via at least one of magnetic attraction and friction and further configured to attach to the fishing line;
    the center piece comprises at least two male insert protrusions;
    the first side comprises at least one female insert cavity in the first channel configured to receive at least one male insert protrusion of the center piece;
    the second side comprises at least one female insert cavity in the second channel configured to receive at least one male insert protrusion of the center piece; and
    the center piece is further configured to lock the center piece, the first side, and the second side in a fixed position relative to each other when the at least two male insert protrusions are inserted into the at least one female insert cavity of the first side and the at least one female insert cavity of the second side.

16. The fishing lure of claim 15, wherein the center piece, the first side, and the second side are in a fixed position relative to each other when the fishing lure is assembled.

17. A fishing lure comprising:
a lure body comprising:
- a first side;
- a second side configured to engage the first side;
- a first channel formed within the first side; and
- a second channel formed within the second side and configured to form a chamber when the first side engages the second side, the chamber encapsulating a center piece and a portion of a fishing line, wherein:
the center piece is configured to fit within the chamber and further configured to attach to the fishing line;
the first side comprises at least one magnetic component;
the second side comprises at least one magnetic component;
the first side and the second side are configured to hold the first side and the second side together through magnetic attraction of their respective magnetic components when the fishing lure is assembled;
the at least one magnetic component of the first side is a first magnetic rim on the interior of the first side;
the at least one magnetic component of the second side is a second magnetic rim on the interior of the second side; and
the first magnetic rim and the second magnetic rim are configured to engage via magnetic attraction in order to hold the first side together with the second side.

* * * * *